April 7, 1964 M. O. EURENIUS 3,127,936
METHOD OF IN SITU HEATING OF SUBSURFACE PREFERABLY
FUEL CONTAINING DEPOSITS
Filed Jan. 2, 1958
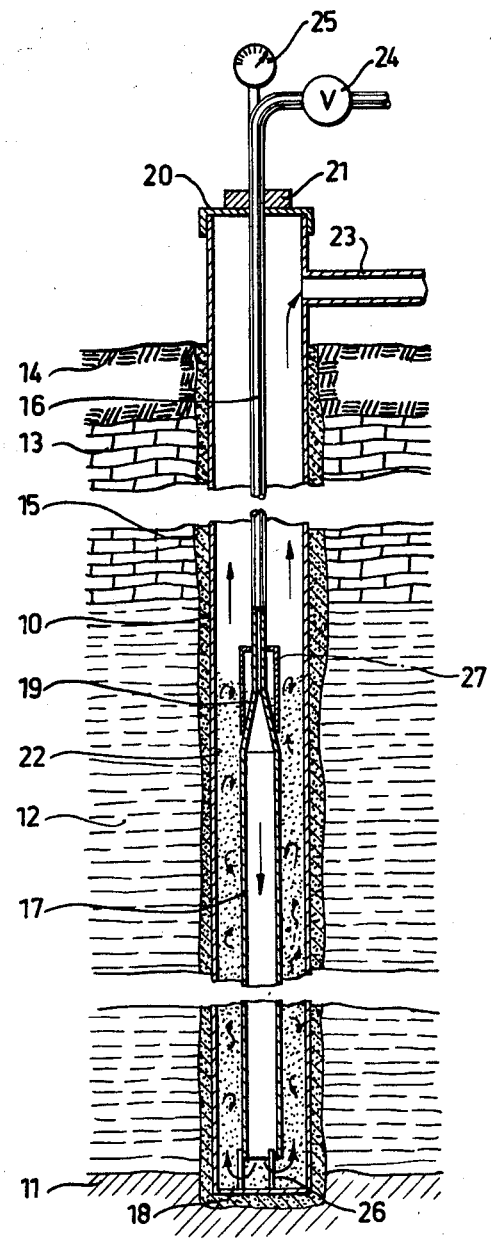
INVENTOR
MALTE OSCAR EURENIUS
BY Sol Shappirio
ATTORNEY United States Patent Office 3,127,936
Patented Apr. 7, 1964

3,127,936
METHOD OF IN SITU HEATING OF SUBSURFACE PREFERABLY FUEL CONTAINING DEPOSITS
Malte Oscar Eurenius, Santa Cruz, Calif., assignor to Svenska Skifferolje Aktiebolaget, Orebro, Sweden, a joint-stock company of Sweden
Filed Jan. 2, 1958, Ser. No. 706,789
Claims priority, application Sweden July 26, 1957
1 Claim. (Cl. 166—39)

The present invention relates to a method of heating subsurface deposits in their natural location in the ground for recovering valuable liquid and/or gaseous products. These deposits may consist for example, of fuel-containing sedimentary deposits such as tar sand or oil shale. For the heating of such deposits it is known to subject to combustion a mixture comprising fuel and a combustion sustaining medium within a tubular heating device inserted into the deposit. In the co-pending U.S. application Serial No. 377,952, entitled "Method of and Means In Heating of Sub-Surface Fuel-containing Deposits in Situ," filed Sept. 1, 1953, Patent No. 2,902,270 patented Sept. 1, 1959, it has been proposed to conduct the flue gases from the combustion zone within the tubular heating device downwardly through a tubular casing and thereupon reversing the flow of said flue gases and conducting them upwardly in a space or zone surrounding said tubular casing. This space or zone is preferably limited externally by a protective casing which is downwardly by a bottom closure and which concentrically surrounds the tubular casing containing the heating zone and thus is in heat conductive connection with the deposit. The purpose aimed at with said type of heating device is to provide a distribution of the heat transfer to the protective tube therethrough to the deposit so as to give to said casing a temperature as uniform as possible along its portion from the lower discharge end of the interior tubular casing to the level of the combustion zone. The sum of heat transferred by radiation from the hot combustion zone which radiation is reduced downwardly and the heat delivered by convection from the upwardly streaming flue gases to the protective casing, which convection is reduced upwarldy due to the gradually falling temperature of the flue gases shall, to express the same object in other terms, be substantially constant for each longitudinal unit of the protective casing. As an additional measure for the same purpose it is proposed in said co-pending application to provide protection against the radiant heat around the combustion zone. A uniform heating of the protective tubular casing along its entire length from the combustion zone downwardly is of importance for an economic recovery of combustible products from the subsurface deposit.

By increasing the thermal effect supplied to the tubular heating device per unit time, the proportion of radiation in the total heat transfer is increased. One main object of the invention is to provide a method ensuring satisfying heat distribution even when the thermal effects to be transferred are high and the portion of the deposit exposed to heating has a large vertical dimension. According to one main feature of the invention, granules of a solid material are caused by a gas rising within the annular space surrounding the tubular heating device, preferably the flue gases, to float therein whereby said granules effect an equalization of the heat transfer to the deposit from the tubular device along the longitudinal direction thereof.

Further objects and advantages will appear from the more detailed description given below, it being understood that such more detailed description is given by way of illustration and explanation and not as limiting since various changes therein may be made by those skilled in the art without departing from the scope and spirit of the present invention.

In connection with such more detailed description the drawing illustrates one form of the invention wherein the figure is a vertical section through a tubular heating device inserted into a subsurface deposit through a borehole penetrating from the surface to said deposit.

In accordance with the present invention, methods for heating fuel deposits in situ in a borehole in the earth include passing hot gases through a heat transfer zone adjacent said deposit to heat the latter, and floating granules of inert solid material suspended in said heat transfer zone to control heat transfer from the heating zone to the deposit. While the hot gases employed may be derived from any source, for instance combustion gases, air, nitrogen, superheated steam, more desirably they are flue gases particularly when derived from combustion of combustible materials in situ in the deposit. In such example, the heating is desirably carried out in a combustion zone for a combustible gas mixture introduced within the deposit as in a borehole vertically placed therein, an inlet for the gas mixture to said zone, an outlet for hot flue gases from said zone, a heat transfer zone adjacent said deposit through which the hot flue gases pass to heat the deposit, and floating granules of inert solid material serving as floating heat carriers are suspended in said heat transfer zone to control heat transfer from said zone to the deposit. Such floating heat carriers are merely agents for heat transfer. The invention also includes apparatus for carrying out such methods.

Referring to the drawing refernece numeral 10 denotes external tubular protective casing 10 forming part of a tubular burner or heating device and adapted to be inserted into a vertical borehole bored from the ground surface. Said bore hole may, for a little distance, penetrate into stratum 11 situated below fuel-containing deposit 12 to be worked. Super-imposed upon said deposit may be stratum 13 of non-combustible material such as limestone which in turn is superimposed near the surface by layer of garden soil 14. The space between protective casing 10 and the wall of the hole may be filled with sand 15, for example, as is disclosed in the U.S. specification No. 2,732,195.

Introduced into protective casing 10 is a tubular structure comprising upper supply tube 16 having a small diameter and coaxial lower flue gas tube 17 having a larger diameter and being open at the base and spaced from bottom 18 of protective casing 10. The transition between said two tubes is formed as downwardly tapering conical burner zone 19. Tubes 16 and 17 are connected to one another so as to be adapted as a joint structure to be inserted into protective casing 10. In the embodiment shown, the tubes are secured by welding to conical burner zone 19. Above the ground surface the protective tube has sealing cover 20 through which the narrow tube 16 passes, the passage if desired being sealed by means of packing 21. Above the surface the tube 16 is provided with control valve 24 and manometer 25.

A mixture containing fuel and a combustion supporting medium such as a combustible gas and oxygen or air is introduced through tube 16. When the mixture is ignited the combustion zone is formed within and below burner zone 19 in a manner disclosed and more specifically described in the co-pending U.S. application Serial No. 401,972, entitled "Apparatus for Recovering Combustible Substances From Sub-Terraneous Deposits In Situ," filed January 4, 1954, Patent No. 2,890,755, patented June 16, 1959. The flue gases flow downwardly inside the wider tube 17 to the lower open end thereof where their flow is reversed so that they flow upwardly within annular space 22 between protective tube 10 and tubular structure 17, 16, to escape through outlet 23 above ground. Downwardly projecting from the tube wall at the lower end of flue gas tube 17 are distance bars 26 so as to keep the tubular structure in its lowest position at a predetermined spacing from bottom 18 of protective casing 10.

According to the basic concept of the present invention, particles or granules of an inert solid material, such as sand grains are kept floating in annular space 22. The cross-sectional area of said space is dimensioned relatively to the volume of the escaping flue gases so as to ensure the speed of motion of said flue gases to be sufficiently high but not too high, to maintain the granules floating. These particles will then be distributed more or less uniformly in the gas stream up to an upper limit, the position of which is dependent on the speed of motion of the gas, the density of the gas, the shape, size and specific weight of the granules in a manner which is known from apparatus comprising a floating bed as used for continuous cracking and other similar operations. In order to attain this floating state, the combustible mixture must be supplied to the heating device under a pressure higher than required if sand or other floating particles are not present.

The effect of the floating granular material is twofold. Firstly, the granules absorb part of the heat delivered from the burner zone and in particular the hottest portion thereof which heats otherwise would have been absorbed by the protective casing. The granules thus have an effect resembling that of the aforementioned protection against radiation. Secondly, the granules in their floating condition move in the vertical direction over rather long distances. Some of them may even be displaced along practically the whole distance between the bottom of the protective casing and the upper limit of the floating layer. Other granules move along a shorter distance only and other granules again only slightly in the vertical direction. Due to the vertical movement, granules which have been positioned adjacent the hottest part of the burner zone and consequently were heated to the highest temperature are displaced to colder zones of space 22 around the tubular structure where they deliver heat previously absorbed by them. Other granules are displaced within the annular space 22 from colder zones to the hottest zone and thus have a relatively low initial temperature and a correspondingly high capacity of absorbing heat. During their movement the granules incessantly abut against one another and during each collision exchange heat. The final result of all these phenomena is an excellent equalization of the temperature along the entire longitudinal dimension of the tube 17.

The inert solid material may be constituted by natural sand such as sea sand, natural gravel, crushed granite or quartz or other natural rocks, crushed or granulated artificial products, such as brick, refractories, silicon oxide, aluminum oxide, glass, porcelain, sintered clay, granules or balls of steel, aluminum, copper, brass or other metals.

The particle size may vary from about 0.1 millimeter to 5 millimeters. The shape of the particles may be sharp edged (crushed materials), irregular (granulated materials) or spherical (steel balls). The granules may be of substantially the same size or comprise a mixture of different sizes. The average size of the granules is chosen so as to attain the desired floating condition in view of the actual dimensions of the protective casing and the tubular structure and the available volumes and pressure drops of the flue gases. When using a relatively soft granular material, the granules are worn so as to cause their size to become reduced gradually. As a consequence the finest particles are conveyed away from the protective casing by the escaping flue gases and a corresponding replacement of granular material in the annular space must be made continuously or intermittently. By suitably choosing the size and quantity of particles in relation to the cross-sectional flow area within the annular space and the quantity of gas, the floating layer may be given any desired vertical dimension.

As an operating example the protective, external tube 10 was a steel tube with an inner diameter of 2½" and a length of 51 feet, inserted in a 50 feet deep, vertical borehole through the formation to be heated. Inside this tube was a heater, consisting of a 32 feet long supply pipe 16, of steel connected to a burner cone 19, which was connected to a flue gas tube 17 of steel with an outer diameter of 1¼" and a length of 20 feet. The length of the distance bars 26 was 2 inches. (In another example the same tube dimensions were used, but no distance bars were used. Instead a clamp was attached to the supply tube 16, above the sealing cover 20 in such a position, that when the clamp rested on top of the cover, the distance from the lower end of the tube 17 to the bottom 18 of the protective tube 10 was about 4 inches (between 2 and 6 inches).)

Before the supply tube 16 together with the flue gas tube 17 was lowered into the protective tube 10 sand was filled into the tube to a level 10 feet above the bottom of the protective tube. The volume of the sand was 2.8 gallons. The sand was a natural sand, consisting mainly of quartz grains, with all grains smaller than 1.7 millimeter. The tubular structure was then inserted into the upper portion of the protective casing and the connetcion with the line supplying air and fuel gas was opened. The mixture of fuel gas and air, flowing through the tubular structure downwards and from its lower end flowing upwards through the annular space between the protective casing 10 and the tubular structure was ignited at the flue gas outlet 23. The flame travelled in the opposite direction in the gas stream until it entered into the tubular structure, where it stopped inside the conical part 19 thereof. Then the tubular structure was lowered until the distance bars 26 sat on the bottom 18 of the protective tube 10 (or until the clamp on the supply tube 16 rested on the cover 20). Since the distance between the lower end of the tubular structure 17 and the bottom 18 of the protective casing (in both cases) was less than the height of the sand mass fed into the casing, said sand during the lowering of the tubular structure was whirled into the annular space 22.

The supply of fuel gas and air to the tubular structure was adjusted so as to cause the burner zone to deliver about 20,000 B.t.u. per hour. The volume of the created combustion gas was about 200 standard cubic feet per hour. At the temperatures prevailing in the annular space this corresponds to an actual gas velocity in the annular space between the protective tube 10 and the flue gas tube 17 of between 100 and 400 feet per hour. The whirling sand grains were carried on this gas stream upwards in the annular space. Above the burner zone (the conical part of the tubular structure) the temperature of the flue gas gradually dropped because of continuous heat transfer to the wall of the protective tube 10. Thereby the actual volume and thus the actual gas velocity decreased and at a certain distance above the burner zone the gas velocity was no longer sufficient to carry the floating particles. They thus started to move downwards until they reached a zone where the gas velocity was sufficient to overcome their kinetic energy and to carry them upwards again. Particles of different sizes were carried to different levels before they turned. However, most particles turned within a narrow range of levels, in this example between 30 and 33 feet above the bottom of the protective tube 10. The heat, evolved in the burner zone was thus transferred substantially to 30 feet of the length of the protective tube 10.

The variations in temperature along said portion of the protective tube was of a magnitude of ±10% of average temperature of said tube.

In other examples, all conditions were the same except that the amount of fuel gas and air supplied corresponded to a heat input of 25,000 resp. 30,000 B.t.u. per hour. Due to the greater flue gas velocities, the particles were carried to higher level before they turned and thus the uniformly heated part of the protective tube was 36 resp. 38 feet wide.

The heat distribution depends on the density of the floating layer in the cross-sectional flow area a consideration which involves the speed of the gas flow in said cross-sectional area. With the heating device described above, the speed of the gas flow above conical zone 19 is lower than below said zone due to the different diameters of supply tube 16 and flue gas tube 17.

In order further to equalize the speed of the gas flow, additional tube 27 may be provided so as concentrically to encase the lowermost portion of supply tube 16 as is indicated in the figure by dotted lines. The diameter of said additional tube 27 may suitably be the same as that of the flue gas tube. By this construction the layer of floating particles will extend higher within the annular space 22 to a corresponding degree. Additional tubes of this type adapted to change the density and consequently the heat absorbing capacity of the floating layer may also be used in any case when it is desired to obtain an irregular distribution of heat following a predetermined pattern instead of a uniform distribution along the casing 10.

In the present invention, the main goal is to transfer heat from one surface (the tubular structure) or from a streaming fluid (the hot flue gases) via the solid particles to another surface, (the protective casing), in order to obtain a certain (even) temperature distribution over the receiving surface. The solid particles are inert and do not react chemically and their actual temperatures are of only secondary interest.

While one more or less specific embodiment of the invention has been described it is to be understood that this is for purpose of illustration only and that the invention is not to be limited thereby, but its scope is to be determined by the appended claim.

Having thus set forth my invention, I claim:

In a method of heating in situ of subsurface deposits for recovery of valuable liquid and/or gaseous products by combustion of a mixture containing fuel and a combustion sustaining medium within an elongated tubular heating member extending into said deposit through which tubular device the flue gases from said combustion are conducted downwardly and then reversed to flow upwardly through a space between said heating member and the wall of the deposit characterized in that granules of an inert solid material of heat transfer modifying character are introduced into and caused to remain in floating condition between the wall of the deposit to be heated and the heating member by gas rising in said space whereby said granules provide predetermined distribution of the heat transfer from said tubular heating member externally thereof to the deposit along the longitudinal direction of said member, in which the tubular heating member has an open lower end, and in starting operation, the granules are introduced to a level exceeding the position of the lower open end edge of the tubular structure when in continuous operation, the feed of the combustible mixture is commenced and said mixture ignited with the said tubular structure lowered towards the mass of introduced granules which thereby are gradually whirled up by the flue gases into said space around said tubular structure.

References Cited in the file of this patent

UNITED STATES PATENTS

| | | |
|---|---|---|
| 2,255,540 | Dreffein | Sept. 9, 1941 |
| 2,459,836 | Murphree | Jan. 25, 1949 |
| 2,780,450 | Ljungstrom | Feb. 5, 1957 |
| 2,890,755 | Eurenius et al. | June 16, 1959 |
| 2,902,270 | Salomonsson et al. | Sept. 1, 1959 |